March 25, 1958 P. J. SWANSON 2,828,048
SALMON EGG DISPENSER
Filed Dec. 15, 1954
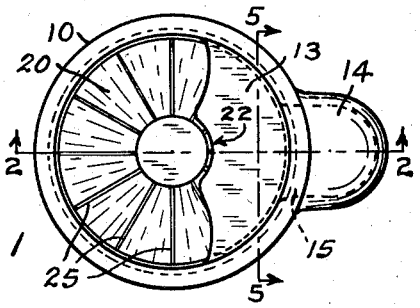
Fig. 1
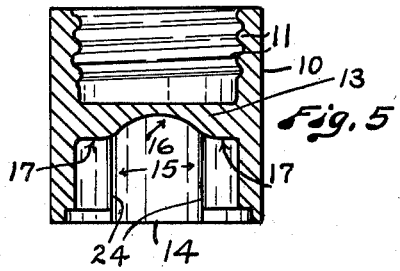
Fig. 5
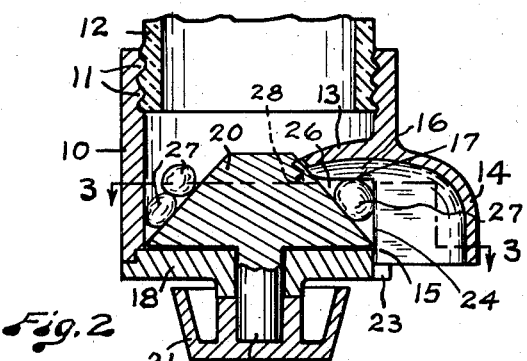
Fig. 2
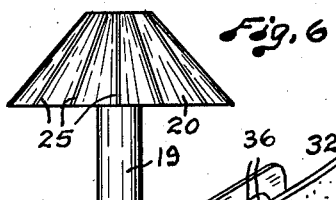
Fig. 6
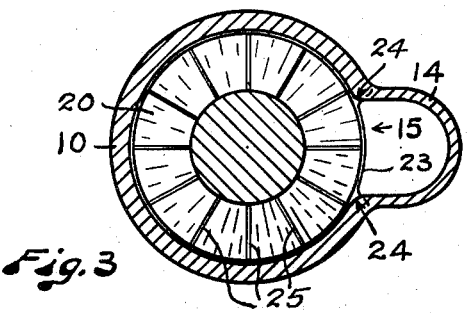
Fig. 3
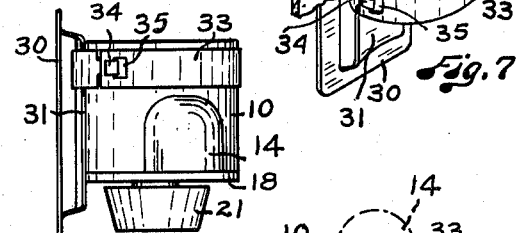
Fig. 7 / Fig. 8
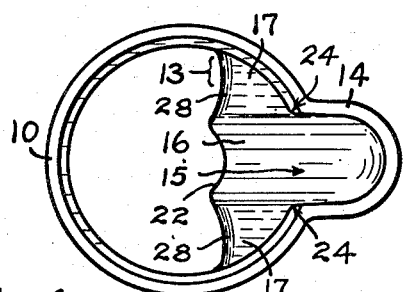
Fig. 4
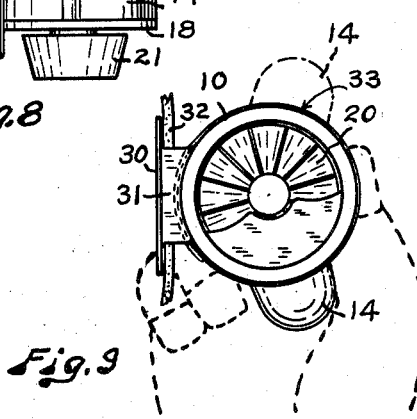
Fig. 9
INVENTOR.
Peter J. Swanson
BY
Fred C. Matheny
ATTORNEY

United States Patent Office 2,828,048
Patented Mar. 25, 1958

2,828,048

SALMON EGG DISPENSER

Peter J. Swanson, Edmonds, Wash.

Application December 15, 1954, Serial No. 475,415

1 Claim. (Cl. 221—277)

My invention relates to salmon egg dispensers for use by fishermen to dispense salmon eggs one at a time for use as bait.

Objects of my invention are to provide a salmon egg dispenser which is simple, compact and durable in construction, not expensive to manufacture, and which is relatively light in weight and easy and convenient for a fisherman to carry and operate.

Another object is to provide a salmon egg dispenser which can be carried on the user's belt and one which will receive and support the original receptacle or jar in which the salmon eggs are packed and sold and one which will deliver the salmon eggs from the original jar, one at a time, directly into the user's hand irrespective of variations in the size of the eggs.

Another object is to provide a salmon egg dispenser which conserves and protects the salmon eggs and which will not crush or mutilate the eggs in dispensing them and will not drop or dispense any of the eggs accidentally.

Another object is to provide a salmon egg dispenser which is equally well adapted for right or left hand use.

Another object of this invention is to provide a salmon egg dispenser comprising a cylindrical egg receptacle having therein a rotatable dispenser cone which is adapted, when rotated, to discharge eggs one at a time outwardly through a passageway of generally triangular shape into a downwardly opening conduit by which the eggs are guided and directed into the hand of the person operating the dispenser.

Other objects of my invention will be apparent from the following description taken in connection with the accompanying drawings.

In the drawings

Figure 1 is a top plan view of a salmon egg dispenser constructed in accordance with my invention.

Fig. 2 is a sectional view of the same taken substantially on broken line 2—2 of Fig. 1, and showing a fragment of a salmon egg jar threaded into the upper end of the dispenser housing.

Fig. 3 is a horizontal cross section, with parts in plan, taken substantially on broken line 3—3 of Fig. 2.

Fig. 4 is a bottom plan view of the cylindrical housing of the dispenser with the bottom plate and dispenser cone and operating knob removed.

Fig. 5 is a view partly in section and partly in elevation taken substantially on broken line 5—5 of Fig. 1, the bottom plate and dispensing cone and operating knob being omitted.

Fig. 6 is a detached elevation of the dispensing cone.

Fig. 7 is an isometric view of a holder used in connection with my invention, showing a fragment of a belt with which it is connected.

Fig. 8 is a side elevation showing the holder of Fig. 7 applied to this dispenser.

Fig. 9 is a plan view, with parts shown in dotted lines and illustrating the use of this invention in dispensing eggs.

Like reference numerals designate like parts throughout the several views.

This salmon egg dispenser comprises a cylindrical receptacle 10 having internal threads 11 at its upper end to receive the externally threaded neck portion of a jar or receptacle 12 of conventional type in which salmon eggs are packed for distribution for bait purposes. About midway between its top and bottom ends the receptacle 10 is provided with an inwardly extending transverse wall or shelf 13 which preferably extends less than half way across the receptacle 10. A downwardly opening discharge conduit 14 projects outwardly from the periphery of the receptacle 10. This conduit 14 is positioned outwardly from the shelf 13 half way between the two ends of said shelf 13 and both the conduit and shelf can be integral with the receptacle 10. An outlet opening 15 in the wall of the receptacle 10 permits discharge of eggs outwardly through conduit 14. The lowermost side of the shelf 13 is concavely recessed upwardly in alignment with the opening 15 and conduit 14 to provide expansion space 16, see Figs. 2 and 5. The lower surfaces 17 of the parts of the shelf 13 outwardly from the recess 16 are substantially flat and lie in a plane below the recessed part 16 and the salmon eggs must pass under these approximately flat surfaces to reach the discharge conduit 14. These flat lower surfaces 17 are beveled or rounded off as indicated at 28, Figs. 2 and 4, so that the eggs will more readily roll under the shelf and will not be held back by this shelf.

A disc shaped bottom plate 18 is rigidly secured to and closes the bottom end of the receptacle 10 and the stem 19 of an egg dispenser cone 20 is rotatively supported by the bottom plate 18. An operating knob 21 is secured to the stem 19 below the plate 18. The base of the cone 20 is only slightly smaller in diameter than the interior of the receptacle 10 and the cone 20 is upwardly convergent and terminates in a flattened or rounded upper end which is positioned near the level of the top of the shelf 13. Preferably the edge of the shelf 13 has a concave part 22 which conforms to the shape of the adjacent part of the cone 20. Also preferably the cone 20 is externally provided with small ribs 25 or like projections which provide better traction between the cone 20 and the salmon eggs.

The bottom disc 18 may have a notch 23 coinciding with the discharge opening 15 to avoid obstructing the discharge of eggs. Preferably the corners 24 formed by intersecting walls of the receptacle 10 and discharge conduit 14 are rounded, Figs. 2, 3, 4 and 5, to avoid injury to eggs passing these corners.

The egg dispensing cone 20 extends under the shelf 13, as best shown in Fig. 2, and cooperates with the flat under surfaces 17 of the shelf 13 and with the adjacent walls of the receptacle 10 to provide triangularly shaped egg outlet passageways 26. It will be understood that one of the passageways 26 is provided at each side of the opening 15 and that the cone 20 may be rotated in either direction to move salmon eggs 27 through the passageways 26 to the discharge opening 15 and conduit 14. The triangular passageways 26 are small enough so that salmon eggs 27 of average size will have to pass through them one at a time. Fig. 2 shows a fairly large salmon egg 27 as it may appear when in one of the triangular passageways 26. This egg is shown as flattened where it contacts the cone 20 and the walls of the receptacle 10 and shelf 13. The expansion space 16, formed by undercutting the shelf 13 in line with the outlet opening 15, gives a large salmon egg 27 room in which to expand when the egg comes into alignment with the opening 15 and this precludes adherence of the egg to the shelf 13 and helps to insure that the egg will drop freely. It will be understood that the exterior of a salmon egg is a fairly tough pliable and deformable member which has some tendency to adhere to surfaces it comes in contact with.

Salmon eggs 27 of small size may not contact the bottom wall 17 of the shelf 13 but these smaller eggs will lie in the trough formed between the cone 20 and the inner wall of the housing 10. None of the eggs will move around to the discharge opening 15 unless the cone 20 is rotated. However, imparting rotary movement in either direction to the cone 20 by grasping the knob 21 will feed the eggs around, one at a time to the opening 15 and discharge them through the conduit 14.

This salmon egg dispenser is designed to be carried on the belt of the user and the holder shown in Figs. 7, 8 and 9 is applicable for this purpose. This holder comprises a rectangular metal plate 30 having its medial portion 31 severed from the marginal portions thereof along two parallel vertical lines and having said medial portion 31 pressed outwardly from the plane of the plate 30 far enough to form a loop through which a belt 32, Fig. 7, may be passed. Preferably the loop portion 31 is concavely bent so that its outer surface will conform to the curvature of the exterior of the receptacle 10. A circular band 33 of flexible metal is drawn tightly around the receptacle 10 and passed through the loop portion 31 of the holder to attach the receptacle 10 to the holder.

The meeting ends of the band 33 may be secured together by bending a hook 34 on one of said ends and engaging this hook within an opening 35 in the other end, or said ends may be secured together in other ways. The band 33 frictionally grips the receptacle 10 tight enough so that ordinarily there will not be any movement of the receptacle 10 in the band 33. However, the receptacle 10 is adjustably held and the user may grasp the band and the receptacle and rotatively adjust the receptacle in the band. For instance, the receptacle 10 may be rotatively adjusted to place the discharge conduit 14 in the position in which it is shown by full lines in Fig. 9. This provides for convenient delivery of salmon eggs into the right hand when the thumb and fingers of the right hand grasp the knob 21 for turning the cone 20. For left hand use the conduit 14 may be placed in the position shown by dotted lines in Fig. 9 so that when the left hand of the user grasps the knob 21 the palm of said left hand will be in a position to receive the discharging eggs. Means, such as notches 36, are provided in or on the loop member 32 to prevent downward slippage of the band 33.

The housing 10 and parts 18, 19, 20 and 21 may conveniently be formed from molded plastic. This provides a dispenser which is not expensive to make, is light in weight, is neat and attractive in appearance, and one which is durable and long lasting and can be easily cleaned. The salmon eggs in this dispenser are well protected from the weather and will not dry out quickly.

The eggs are readily accessible by the use of one hand only and can be dispensed one or more at a time directly into the palm of the hand as they are needed.

The foregoing description and accompanying drawings clearly disclose a preferred embodiment of my invention but it will be understood that this disclosure is merely illustrative and that such changes in the invention may be made as are fairly within the scope and spirit of the following claim.

I claim:

A salmon egg dispenser to be worn on the belt comprising a cylindrical receptacle having a discharge opening in the side wall thereof adjacent its lower end; internal threads in the upper end portion of said receptacle capable of receiving the externally threaded end portion of a jar containing salmon eggs for bait; a downwardly opening discharge conduit extending outwardly from the circumferential wall of said receptacle and spanning said discharge opening; an upwardly convergent dispenser cone rotatively mounted coaxially of said receptacle in the lower portion thereof, the diameter of the lower end of said cone being slightly less than the diameter of the receptacle providing a V shaped salmon egg receiving chamber wherein the lowermost annular row of salmon eggs are in contact with both said cone and the inner wall of said receptacle; a turn knob connected with the cone and positioned below and adjacent to and coaxially of the receptacle; a shelf within the receptacle above the discharge opening extending from the inner wall of the receptacle into close proximity to the upper portion of the cone, said shelf in cooperation with said cone and the wall of said receptacle providing substantially triangular salmon egg passageways at opposite sides of the discharge opening through which salmon eggs are drawn by rotation of the cone with the eggs contacting all three walls forming the triangular recess, the shelf overhanging the cone and having an upwardly concave recess in its lower wall in registration with the discharge opening providing expansion space for deformable salmon eggs drawn by the cone through the triangularly shaped openings into alignment with the discharge opening, the downwardly opening discharge conduit being positioned to deliver salmon eggs into the palm of the hand when the fingers of the hand grasp the knob in turning the same.

References Cited in the file of this patent

UNITED STATES PATENTS

| | | |
|---|---|---|
| 1,325,142 | Cole | Dec. 16, 1919 |
| 1,562,152 | Du Grenier | Nov. 17, 1925 |
| 2,057,768 | De Motte | Oct. 20, 1936 |
| 2,117,685 | Smith | May 17, 1938 |
| 2,210,086 | Leake | Aug. 6, 1940 |
| 2,227,167 | Warren | Dec. 31, 1940 |